United States Patent [19]

LaCoste

[11] 3,717,036
[45] Feb. 20, 1973

[54] FORCE MEASURING DEVICE

[75] Inventor: Lucien J. B. LaCoste, Austin, Tex.

[73] Assignee: LaCoste and Romberg, Inc., Austin, Tex.

[22] Filed: April 6, 1970

[21] Appl. No.: 25,915

Related U.S. Application Data

[63] Continuation-in-part of Ser. No. 700,533, Jan. 25, 1968.

[52] U.S. Cl. ................................................73/382
[51] Int. Cl. ..............................................G01v 7/04
[58] Field of Search................73/382, 514–517; 267/1 DP

[56] References Cited

UNITED STATES PATENTS

| | | |
|---|---|---|
| 2,293,437 | 8/1942 | La Coste et al. ..................73/382 |
| 2,753,544 | 7/1956 | Cox et al. ..........................73/71.2 |
| 3,020,767 | 2/1962 | Kistler ........................267/1 DP X |
| 3,281,778 | 10/1966 | Luke et al. ..........................340/17 |
| 3,323,372 | 6/1967 | Kistler et al. ....................73/517 B |

*Primary Examiner*—James J. Gill
*Attorney*—J. Vincent Martin, Joe E. Edwards and Jack R. Springgate

[57] ABSTRACT

A force measuring device including a mass, a frame and substantially equal length links supporting said mass with respect to said frame so as to permit only translation of the mass in a line accompanied by a rotation about an axis parallel to the direction of translation. The abstract hereinbefore set forth is neither intended to define the invention of the application which, of course, is measured by the claims, nor is intended to be limiting as to the scope of the invention in any way.

15 Claims, 10 Drawing Figures

Lucien J. B. La Coste
INVENTOR.

Lucien J. B. LaCoste
INVENTOR.

FORCE MEASURING DEVICE

CROSS REFERENCE TO REDATED APPLICATION

This application is a continuation-in-part of my copending application Ser. No. 700,533, filed Jan. 25, 1968.

BACKGROUND OF THE INVENTION

In force measuring instruments high accuracy can be attained either by high accuracy measurement of the displacement of the movable element, by suspending the movable element in a way to achieve high displacement sensitivity, or by a combination of both methods. Previously the best device for achieving high displacement sensitivity in a horizontal accelerometer or seismometer was the horizontal pendulum. This pendulum swings about an approximately vertical axis so that the pendulum motion occurs in an approximately horizontal plane. In such a device, small changes in level or horizontal acceleration produce large changes in the position of the pendulum; therefore, it has a high displacement sensitivity.

Also, the device with the greatest displacement sensitivity that was previously available for use as a gravity meter, vertical accelerometer or vertical seismometer the "zero length spring" suspension. Such device is described in the LaCoste et al. U. S. Pat. No. 2,293,437 issued Aug. 18, 1942. In it the force responsive element is pivoted on a substantially horizontal axis and is supported by a "zero length spring," which is a spring whose unstretched length is zero or would be zero if the turns of the spring did not interfere with each other when the spring is unloaded. The zero length spring suspension has a very high displacement sensitivity as explained in the aforementioned patent.

Both the horizontal pendulum and the zero length spring suspension have the following disadvantages. First, the displacement sensitivity is affected by tilting the instrument. This is obvious in the case of the horizontal pendulum and is shown in the previously cited patent for the case of the zero length spring suspension. Second, in both devices the motion of the center of gravity of the movable mass is a circle rather than a straight line. Therefore, the response of the mass to a given force is not independent of the position of the mass in its circular path of motion. In other words, the direction of the sensitive axis (direction of maximum sensitivity or the sensing direction) varies with the position of the movable mass. This variation of the direction of the sensitive axis causes two types of problems. One problem is that interpretation or processing of data is made more complicated in seismology and in inertial guidance. The other problem is that errors are produced when gravity meters or accelerometers are subjected to simultaneous accelerations in different directions. Such errors are known as cross-coupling errors and are described on Pages 99–109, Vol. 32 of Geophysics (1967).

SUMMARY

The present invention relates to improvements in force measuring devices and particularly to the improved mounting of a force responsive element with respect to its support. The improved force measuring device of the present invention may be used as a sensitive level, gravity meter, a horizontal or vertical accelerometer and as a long period horizontal or vertical seismometer.

An object of the present invention is to provide an improved force measuring device having a movable force responsive element whose sensitive axis does not deflect with movement of the element.

Another object is to provide an improved force measuring device having a movable force responsive element with a high ratio of damping to the mass of the movable element.

A further object is to provide an improved force measuring device having a movable element and whose displacement sensitivity and period are not appreciably affected by tilting of the device or by displacement of its movable element from a reference position.

A further object is to provide an improved force measuring device which may be used to measure tilt, gravity, horizontal acceleration, vertical acceleration, horizontal seismic motions and vertical seismic motions.

Still another object is to provide an improved force measuring device having a movable force responsive element and having a relatively small restoring force on such element whereby the device has a high displacement sensitivity.

BRIEF DESCRIPTION OF THE DRAWINGS

These and other objects and advantages of the present invention are hereinafter set forth and explained in the description of the embodiments shown in the drawings wherein.

DESCRIPTION OF THE PREFERRED EMBODIMENTS

Figure 1:
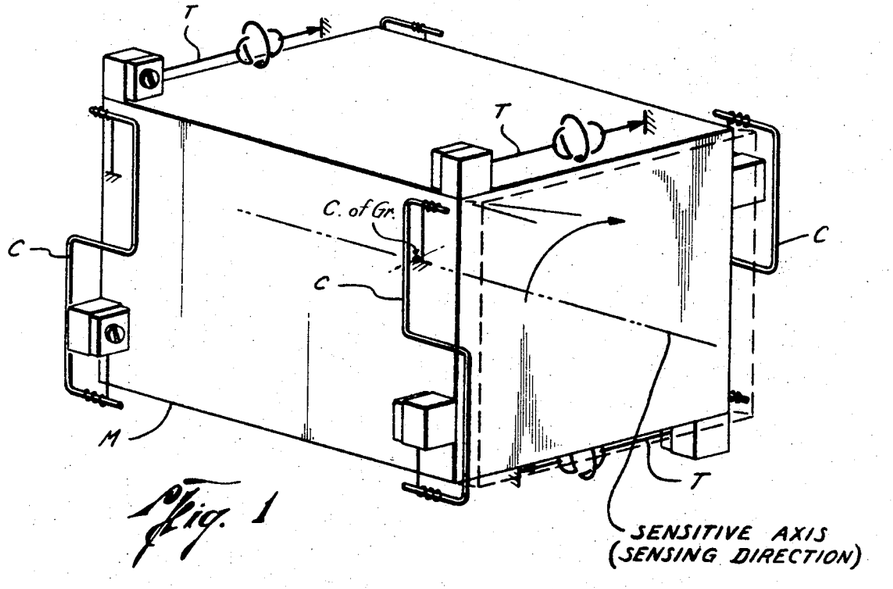
FIG. 1 is a perspective view of the movable force responsive element or mass and its mounting illustrating the sensitive axis and further showing in dashed lines the position of the mass after movement of the mass along its sensitive axis.

The movable element or mass M and its mounting is shown in perspective in FIG. 1 so that the mounting and motion of mass M may be more readily understood. As shown, the mass M is a rectangular solid structure. The sensitive axis is so designated and as preferred, extends through the center of gravity (C of G) of mass M and two ends of mass M. The top, bottom and sides are provided with a pair of links connecting between the mass M and a suitable frame such as the housing illustrated in the other Figures of the drawings. Such fixed ends of the links are illustrated schematically in FIG. 1.

Two tension links T are provided on the top of mass M and two tension links T are provided on the bottom of mass M. Two compression links C are provided on each side of the mass M. With reference to the end of mass M shown in FIG. 1, the two tension links near such end (top and bottom) are arranged to resist counterclockwise movement of mass M. The two compression links near such end are arranged to resist clockwise movement. The effective length of all links are substantially the same. It is preferred that the connection of all links to the mass M be substantially equidistant from the sensitive axis and that the connection of all links to housing or frame be substantially equidistant from the sensitive axis. The mounting of mass M thus includes a plurality of equal length links that are parallel in pairs.

Movement of mass M is restrained except along its sensitive axis. When mass M is moved along its sensitive axis it is subject to rotation about its sensitive axis because of the angular displacement of the connection of the links to the mass M with respect to the fixed end of the links. The one end of mass M is shown in dashed lines at the position it would have if mass M were moved along its sensitive axis in the direction of the arrow at the end of the sensitive axis. The arcuate arrow indicates the direction of movement of mass M about its sensitive axis responsive to movement therealong. Return movement of mass M reverses the direction of rotation until mass M reaches its normal or central position. Further movement in such opposite direction results in a rotation of mass M in the same direction indicated by the arrow.

As hereinafter explained, each of the links includes fine wire ends, preferably formed in loops and connected by a relatively stiff connector which is adapted to be resilient under impact loading only. Such links, therefore, provide a minimum of restoring force when the mass M is displaced but are protected from damage due to impacts or other shock loadings.

Figures 2, 3, 4:
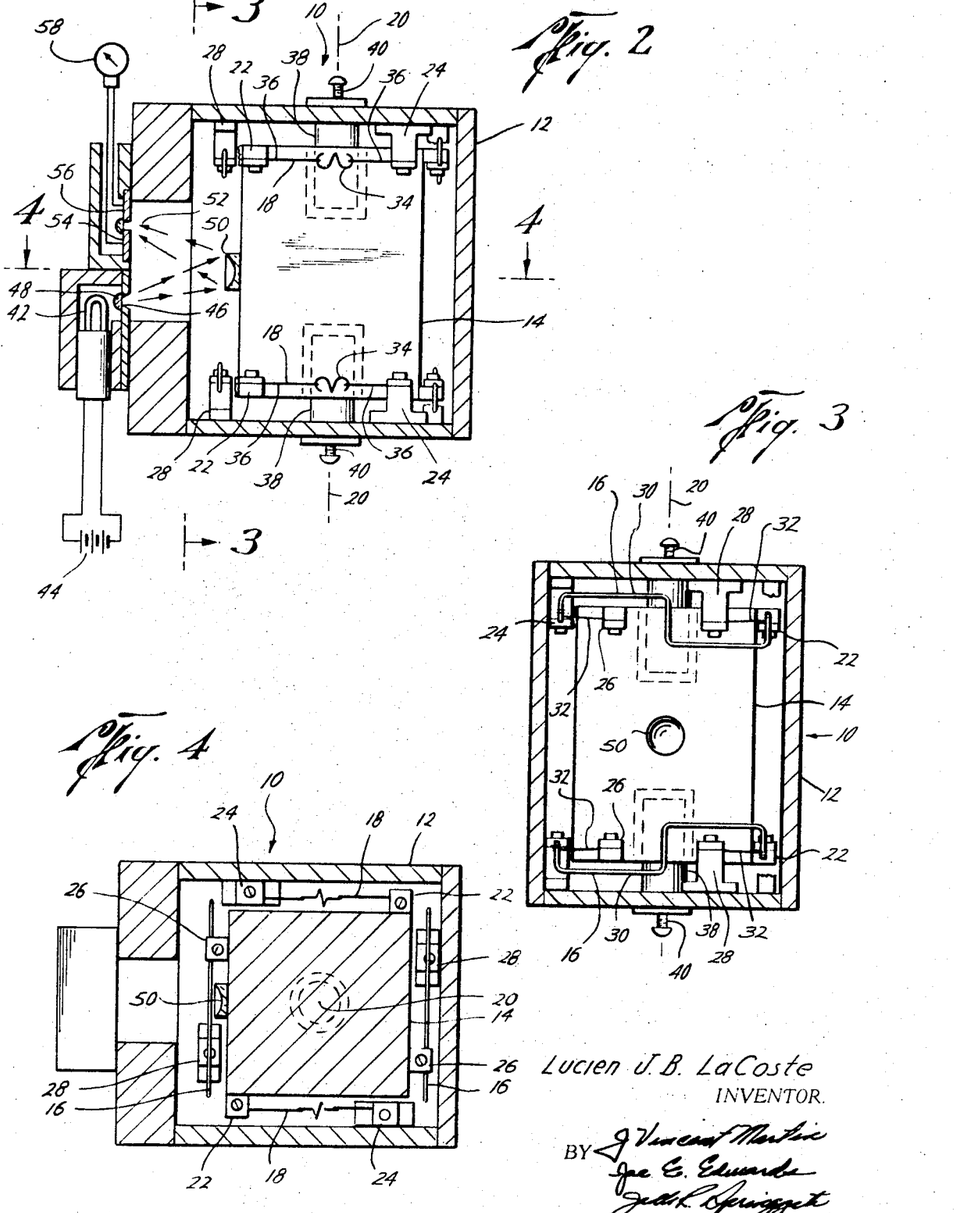
FIG. 2 is a plan view of the device of the present invention with the housing in section to illustrate the mounting of the movable element or mass in the housing.
FIG. 3 is a sectional view of the device taken along line 3—3 in FIG. 2.
FIG. 4 is another sectional view of the device taken along line 4—4 in FIG. 2.

The force measuring device 10 illustrated in FIGS. 2, 3, and 4 may be used as a tiltmeter, a horizontal accelerometer, or a horizontal seismometer. In the device 10, its sensitive axis is positioned horizontally as hereinafter explained.

The force measuring device 10 includes the housing 12 and the mass 14 mounted therein. The mass 14 which is a six-sided solid having rectangular faces is supported within the housing 12 by the compression links 16 and the tension links 18. As shown in the drawings, the sensitive axis 20 extends horizontally through the device 10. The tension links 18 connect to projections 22 on each end of the top and bottom sides of mass 14 and to lugs 24 extending from the housing 12 and positioned near the top and bottom of the mass 14 near the opposite sides thereof from projections 22. Similarly the compression links 16 connect to projections 26 on each end of the opposite sides of mass 14 and to lugs 28 extending from the housing 12 and positioned near the sides of mass 14 near the top of mass 14 on one side and the bottom of mass 14 on the other side. Each of the links extends from its connection to the mass 14 to its connection on the housing 12 in the same rotational sense as best seen in FIG. 4.

A relatively free moving stable support for mass 14 is provided by the links 16 and 18. When viewed as shown in FIG. 4, the tension links 18 are mounted to prevent clockwise movement of mass 14 and movement of mass 14 to the right or left and the compression links 16 are mounted to prevent counterclockwise movement of mass 14 and movement of mass 14 upwardly and downwardly.

Pairs of links 16 and 18 are substantially parallel and all links have substantially the same length. Also, it is preferred that the points of connection of the links 16 and 18 to the mass 14 and the housing 12 be substantially the same distance from the sensitive axis 20. With this linkage structure supporting mass 14 within housing 12, the movement of mass 14 is only along sensitive axis 20 with a slight rotation thereabout as herein explained.

The links 16 and 18 are relatively of fixed length but are sufficiently resilient to be yieldable in length under impact. The compression links 16 each include the relatively stiff connection member 30 which has an S shape and is longer than the effective length of the compression link as shown. The tension members 32 which are preferably thin wire loops connecting from the connection member 30 to the lugs 28 and to the projections 26, respectively, each include the relatively stiff spring connection member 34 and the tension members 36 which are preferably thin wire loops connecting from the spring connection member 34 to the projections 22 and the lugs 24, respectively.

A damping means, such as, dampers 38, is provided to dampen the movement of mass 14 along sensitive axis 20 within housing 12. The dampers 38 are shown to be cylindrical plugs supported on housing 12 and extending inwardly to be positioned within cylindrical recesses in mass 14. The dampers 38 are mounted concentrically with respect to sensitive axis 20. Limit means, stop screws 40, are provided to limit the movement of mass 14 with respect to housing 12. The stop screws 40 extend through housing 12 and dampers 38 and project therefrom into the recesses defined in mass 14. Screws 40 are adjustable, that is, they may be threaded inwardly or outwardly to change their position and to thereby change the range of movement of mass 14.

The displacement of the mass 14 can be measured in many ways. The method shown in FIGS. 2, 3 and 4 is a photoelectric cell method. The lamp 42 operated by the battery 44 illuminates the slit 46 through the condensing lens 48. The light from the slit 46 falls on the concave mirror 50 fixed to the mass 14 and is reflected to form an image 52 of the slit 46. The image 52 falls on the opposed photoelectric cells 54 and 56 (silicon sun batteries in the preferred embodiment). As the mass 14 deflects from its center position, the image 52 moves toward one or the other of the photoelectric cells. The electrical output of the opposed photoelectric cells operates the microammeter 58 to indicate the displacement. It is often desirable to insert an amplifier between the outputs of the photoelectric cells 54 and 56 and the microammeter 58.

An inspection of the Figures will show that the eight links permit translation of the mass 14 along the axis 20 and that this translation is accompanied by a slight rotation of definite amount about the axis 20. It is desired to adjust the eight links so that the translation of mass 14 is accurately along the axis 20. It is also desired to adjust the center of gravity of mass 14 so that it is very nearly on the axis 20. The purpose of the center of gravity adjustment is to eliminate the effects of rotation of the mass 14 except for a generally negligible inertia effect. The required adjustment of the links to obtain straight line motion is as follows.

If the stiffness of the fine wires 36 in links 18 is neglected, the effective lengths of the links 18 are the distances between the points where the fine wires 36 are clamped respectively to the lugs 24 and to the projections 22. If the stiffness of the fine wires is taken into account, the effective length will be slightly less. A correction can be made if necessary. On the other hand, the effective length of links 16 will be slightly greater than the distance between the points where the fine wires 32 are clamped respectively to the lugs 28 and the projections 26.

Neglecting the restoring forces in the fine wires, there are four conditions to be met to make the center of gravity of the mass 14 move accurately in a straight line along the axis 20. One of the conditions to be satisfied is that the lengths of all the links 16 and 18 should be equal. A second condition is that the fixed ends of all of the above links 16 and 18 should be the same distance from the axis 20. A third condition is that the movable ends of all of the above links 16 and 18 should be the same distance from the axis 20. The fourth condition is that all the links are parallel to a plane such as defined by line 4—4 in FIG. 2 when the mass 14 is centered with respect to the housing 12. However, this is more restrictive than necessary; it is merely necessary that all the links be parallel to the plane 4—4 at some position of the mass 14 in its travel, or that all the links make substantially the same angle with the axis 20 for any position of the mass 14.

If the preceding conditions are satisfied, it can be seen that the mass 14 can translate along the axis 20 with an accompanying slight rotation about axis 20 and without any change in length of any of the links. There will therefore be no forces aiding or resisting the motion except the slight restoring force due to bending of the fine wires and, of course, the force of gravity. The effect of gravity can be cancelled out by tilting the device to make its sensitive axis 20 perpendicular to the direction of gravity; or the force of gravity on the movable mass can be balanced by adding the zero length springs as hereinafter explained. Although the preceding analysis was made without including the effects of the stiffness of the fine wires, the four conditions given are still valid if they are modified to refer to the effective lengths and effective ends of the links instead of to the actual lengths and ends.

The previously mentioned restoring force due to stiffness in the fine wires can be very nearly counterbalanced by slightly modifying the conditions given in the preceding paragraph. In order to see how this can be done, consider the case in which one of the links 18 is made shorter than the other links. As the mass 14 moves away from the center position shown in the Figures, the short link 18 is made longer, which involves stretching the connector 34. This stretching of connector 34 tends to bring the mass 14 back to its center position or in other words increases the restoring force in the suspension. The same analysis holds for shortening any of the links 18. Now consider the effect of shortening one of the links 16. Again as the mass 14 moves away from the center position in the Figures, the shortened link 16 is made longer. However, in this case the lengthening of the connector 30 decreases the force it exerts. This tends to move the mass 14 away from its center position, or decreases the restoring force in the suspension. The same is true if any of the links 16 are shortened since they also contain the connectors 30. It is therefore apparent that the restoring force in the suspension can be controlled by adjusting the lengths of the various links.

It is also possible to control the restoring force by changing the distances from the ends of the links 16 and 18 to the axis 20. For instance, consider the case in which the ends of one of links 18 are placed closer to axis 20 without changing the length of the link. Then when the mass 14 moves away from its center position, this link 18 is stretched, which tends to bring the mass 14 back to center. This shows that moving the ends of link 18 closer to axis 20 increases the restoring force of the suspension. It is therefore apparent that the restoring force can be controlled by several different adjustments. In practice, it has been found most convenient to adjust one or more of the fixed lugs 24 along the direction of the associated link and to change the length of the connector 30 or 34 in the link if necessary. It is also apparent that the four conditions previously given for perfect operation need not be accurately satisfied because the effects of any moderate deviation in one link or its points of attachment can be very nearly counterbalanced by suitable adjustments in other links or in their points of attachment. In practice, the four previously mentioned conditions are approximated as closely as feasible and then suitable adjustments are made to obtain the desired sensitivity.

The optimum tension to put into the links depends upon the application. The tension should be sufficient to prevent any link from becoming slack when the device is subjected to the maximum expected transverse acceleration. On the other hand, hysteresis errors increase with increased tension, so the tension should not be greater than necessary. The fine wire should be as fine as possible for the desired factor of safety. The stops 40 are ordinarily provided to prevent damage to the fine wires when the instrument is roughly handled. The connectors 30 and 34 are generally made resilient to limit the maximum force in the fine wires in such cases. The optimum value of the spring constants of the connectors 30 and 34 depend upon how much lateral motion of the mass 14 can be tolerated at the maximum expected lateral accelerations. A gravity meter or accelerometer designed for use at sea must be fairly stiff laterally but an instrument to measure tilt on land need not be stiff.

In FIGS. 2, 3 and 4, one set of four links 18 are shown parallel to each other and the other links 16 are also shown parallel to each other and substantially perpendicular to the first set. It is not necessary that these conditions be satisfied; they are merely a convenience in manufacture and result in a symmetrical instrument. The links are also made symmetrical about the plane 4—4 when the mass 14 is at some reference position; this condition is also unnecessary but is convenient. For example, the device would work equally well if links 16 and 18 at one end of mass 14 were all rotated through the same angle about the axis 20. The same is true if any link is translated any desired amount in the direction 20.

When the device of the present invention is to be used as a gravity meter, a vertical accelerometer or a vertical seismometer, it is rotated so that the sensitive axis 20 extends vertically and zero length springs are added as hereinafter described. This form of the device is shown in FIGS. 5, 6, 7 and 8. In such Figures, all parts common to the form of the device illustrated in FIGS. 2, 3 and 4 are designated by the same numbers. Thus, this modified device includes the housing 12 with the mass 14 supported therein by the linkage system of compression links 16 and tension links 18. The sensitive axis 20 has been turned to extend vertically as shown in the elevation view of FIG. 5. Suitable dampers 38 and stops 40 are provided. The links 16 and 18 are all constructed as previously described.

Figures 5, 6, 7:
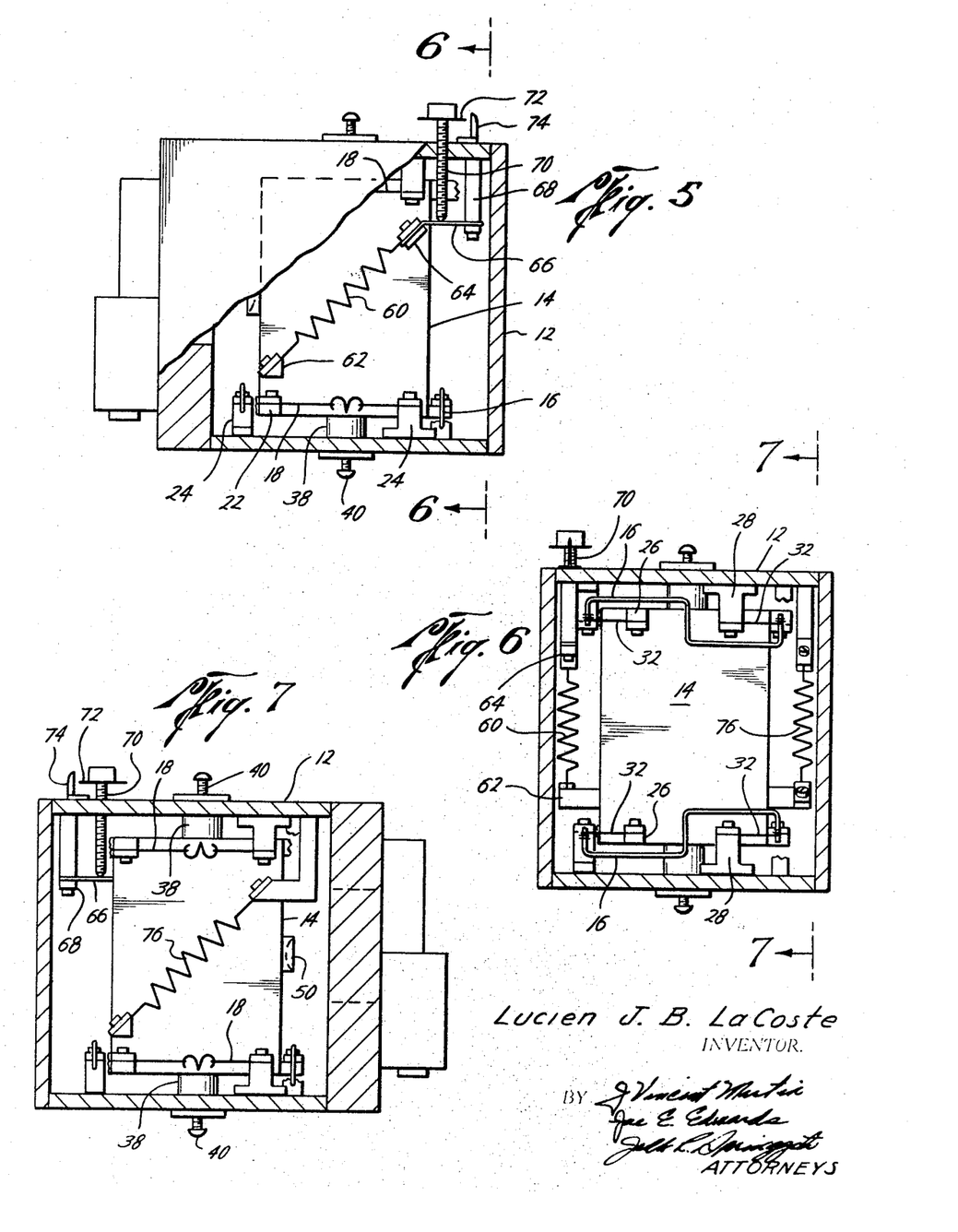
FIG. 5 is a side view of a modified form of the device of the present invention with a portion of the housing broken away to illustrate the mounting of the zero length spring between the housing and the mass.
FIG. 6 is a sectional view of the device taken along line 6—6 in FIG. 5.
FIG. 7 is another sectional view of the device taken along line 7—7 in FIG. 6.

In FIG. 5, the spring 60 is shown attached to the projection 62 on the movable mass 14 and the clamp 64 which is supported by the housing 12. The preferred method of making attachments is to clamp fine wire loops to the projection 62 and to the clamp 64 and to hook the spring to the loops. The clamp 64 is adjustably supported by the housing 12 through the leaf spring 66 which is clamped to the lug 68 on the housing 12. Adjustment of the leaf spring 66 is accomplished by the calibrated screw 70 which is threaded through the housing 12 and whose end bears against the leaf spring 66. Turning the screw 70 adjusts the clamp 64 vertically thereby changing the tension in the spring 60 to balance the force of gravity on the mass. The position of the screw 70 can be read by means of the dial 72 fixed to it and the pointer 74 fixed to the housing 12. The spring tension may also be adjusted by the lever system as shown and described in the LaCoste et al. U.S. Pat. No. 2,377,889, issued June 12, 1945. Such lever system is believed to provide a greater degree of accuracy than the leaf spring system shown.

Although the single spring 60 is adequate to give good operation of the invention, a second spring 76 is generally added in order to give more symmetry to the suspension. The second spring 76 is shown in FIGS. 6 and 7. It is attached similarly to the spring 60 and is shown without any means for vertical adjustment of its upper clamp. Such means can, of course, be added but is generally unnecessary.

In order to attain the high displacement sensitivity or long period that is desired, the springs 60 and 76 should be "zero length springs." Such springs are described in the aforementioned U.S. Pat. No. 2,293,437. A "zero length spring" is a spring whose unloaded length is zero or would be zero if its turns did not interfere with each other when the spring is unloaded. The force exerted by such a spring is (according to Hooke's law) $f = ks$ when $k$ is the spring constant and $s$ is its length. If the spring were not a zero length spring, the force would be $f = k(s-s_o)$ where $s_o$ is the length of the spring when it is unloaded. The behavior of a zero length spring is used to obtain high displacement sensitivity. If more than one spring is used, the combination of the springs might be equivalent to a zero length spring although the individual springs are not all zero length springs. In such a case at least one spring must have a negative unstretched length which is balanced by the unstretched lengths of the others of which at least one must have a positive unstretched length.

In addition to using zero length springs, they are to be connected at proper places to the mass 14 and to the housing 12. In FIG. 5, spring 60 is shown connected to the mass 14 at a point which is in line with the points of attachment of the tension links 18 on the same side of mass 14 as spring 60. Also, spring 60 is shown connected to the clamp 64 at a point which is in line with the points of attachment of the other ends of such links 18 to the housing 12. As hereinafter explained, the above conditions for attaching the ends of the spring 60 provide the desired results. However, it is noted that these conditions are more restrictive than necessary. For example, the same results will be obtained if both ends of spring 60 are rotated through the same angle about the axis 20. In fact, a rotation of 180° about axis 20 moves the spring 60 to the position occupied by the spring 76.

Figure 8:
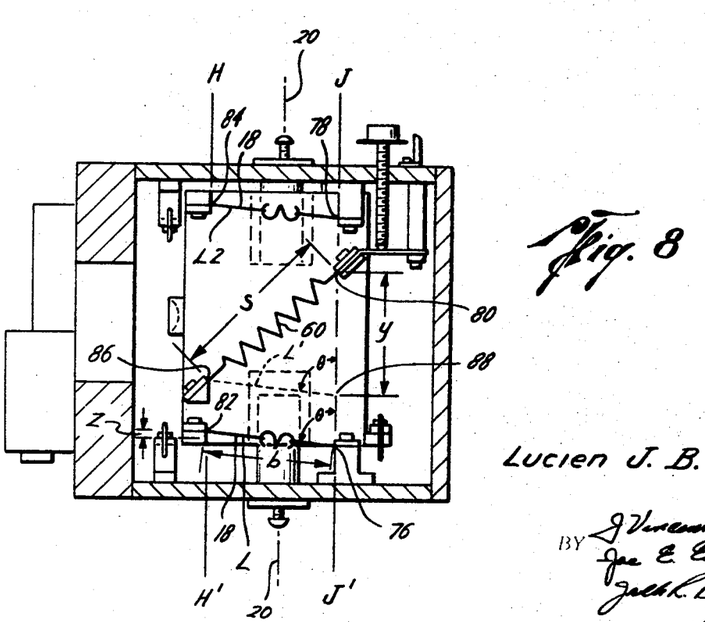
FIG. 8 is a diagrammatic view in elevation of the force measuring device to illustrate the relationships developed in the equations.

In order to determine the force exerted by the spring 60 on the suspension, reference should be made to the diagram in FIG. 8. There, the same nomenclature is used as previously. The points of connections 76, 78 and 80 are fixed on the housing 12 and lie on the straight line JJ'. Similarly the points of connection 82, 84 and 86 are all fixed to mass 14 and lie on the straight line HH'. Since the two tension links L and L2 are always parallel and are of equal lengths (as has been stated previously) the quadrilateral 76, 82, 84, 78 is a parallelogram. A line drawn through 86 parallel to lower link 18 intersects JJ' at 88. The link from 76 to 82 is designated L and the link from 78 to 84 is designated L2. The line 86–88 is denoted by L'. It can be seen from elementary geometry that the length of L' is the same as the lengths of the links L, L2; this length is denoted by $b$ as shown. Also the length of the spring 60 is denoted by $s$; the length of the line 80–88 is denoted by $y$; and the angle between L or L' and the line JJ' is denoted by $\theta$ as shown. L' can be considered to be a virtual link since a link could be put there without affecting the performance of the suspension.

A convenient way to determine the force exerted by the spring 60 is to obtain it from the potential energy of the spring. The well known formula for the potential energy of a spring is $$(1)\ V = k(s-s_o)^2/2$$

where $V$ is the potential energy, $k$ is the spring constant and $s_o$ is the unstretched length of the spring. For a zero length spring $s_o$ is zero, therefore $$(2)\ V = ks^2/2$$

Using the cosine law, (2) becomes $$(3)\ V = k(y^2+b^2 - 2yb\cos\theta)/2$$

It has previously been stated that the translational motion of the movable mass 14 is along the axis 20, which is parallel to the lines HH' and JJ'. Therefore the potential energy $V$ should be differentiated with respect to the direction 20 to get the required force exerted on the mass 14 in the direction of its motion. In FIG. 8, it can be seen that motion along HH' (or 20) of point 82 is given by $z = b\cos\theta$. This motion along 20 is also the translation of the mass 14 along 20 because the only other motion of the mass is a rotation about 20. Accordingly the force exerted on the mass 14 along the direction 20 by the spring 60 and the links 16 and 18 is $$(4)\ f = -dV/dz = ky$$

Equation (4) will presently be used to show that the device can theoretically be adjusted to have an infinite sensitivity and therefore the equation is of vital importance in this disclosure. Furthermore, equation (4) might at first sight appear to be incorrect because it states that the force is the same for any displacement of the mass 14 along the sensitive axis 20. This does not appear to be reasonable because the force exerted by the spring certainly increases as the mass moves downward and also the angle the spring makes with the sensitive axis decreases with such movement. Since both of these effects tend to increase the force exerted on the mass, it might appear that the force would increase with downward movement of the mass. The apparent contradiction vanishes, however, when the forces exerted by the links 16 and 18 are taken into account. Because of the importance of equation (4) the following detailed analysis will be made of all the forces acting on the mass 14.

The relation between the spring force and the link forces can be determined from the fact that the counterclockwise torque about the sensitive axis 20 must equal the clockwise torque. To compare these torques it should be noted that the lever arms for all the link forces are equal because of the previously described symmetry of the suspension. Furthermore, the lever arm for the spring force will equal the lever arm for the link forces because the spring is in the same plane with two of the links. If this common lever arm is denoted by 1, if the forces in the links are denoted by $F_1, F_2, - F_8$, and if the angle between the spring and the sensitive axis is denoted by B, then the total torque about the sensitive axis 20 is (4.1)
$$T = (1\sin\theta)\sum_{i=1}^{8} F_i + (1\sin B)ks = 0$$

Also, applying the sine law to the triangle 80-86-88 in FIG. 8 we find (4.2) $s/\sin\theta = b/\sin B$ Combining (4.1) and (4.2) gives (4.3)
$$\sum_{i=1}^{8} F_i = -kb$$

The sum of the components of the spring and link forces acting on the mass 14 along the direction of the sensitive axis 20 will then be (4.4)
$$f = ks\cos B - \sum_{i=1}^{8} F_i \cos\theta$$
$$= k(s\cos B + b\cos\theta)$$
$$= ky$$

which is the same as equation (4).

Use will now be made of (4) to show that theoretically an infinite sensitivity can be achieved with the suspension. If the center of gravity of the mass 14 is on the axis 20, gravity can affect the suspension only along the axis 20. Therefore, 20 is the sensitive axis of the device and the sum of the spring and gravitational forces acting on the mass 14 is, for any position of the mass 14, (5) $f_0 = ky - mg\cos\phi$ (or $f_0 = ky + k'y' - mg\cos\phi$ for two springs)

where $m$ is the mass of 14, $g$ is the acceleration due to gravity, $\phi$ is the angle 20 makes with vertical, and $k'$ and $y'$ are analogous to $k$ and $y$ for the second spring. If the spring constant and the distance $y$ are properly chosen $f_0$ will be equal to zero for any position of the movable mass. In other words, there will be no restoring force. This is the well known condition for infinite sensitivity in a force measuring instrument or infinite period in a seismometer.

Although restoring force in the fine wire suspensions and hysteresis in the spring prevents the practical attainment of infinite sensitivity, a very high sensitivity can be attained by carefully adjusting the links 16 and 18 as previously explained.

An inspection of FIG. 8 will show that the spring 60 and the virtual link L' actually constitute a zero length spring suspension. It is therefore possible to increase the sensitivity of the suspension by moving the point of attachment 80 of the spring horizontally to the right in FIG. 8 and vice-versa. Also, the sensitivity can be made greater for small values of the angle $\theta$ than for large values by making the unstretched length of the spring negative rather than zero, and vice-versa. These properties of the suspension are used in making the final adjustments for sensitivity and linearity.

As may be seen from the preceding discussion, the center of gravity of the movable mass 14 travels in the straight line path 20 and the sensitive axis is 20 which is a fixed direction with respect to the housing 12. This avoids cross-coupling errors in gravity meters and accelerometers and simplified interpretation or processing of seismic or other data. Also, the suspension system has been shown to have very little restoring force, thereby making high displacement sensitivity possible in tilt meter, gravity meters and accelerometers, and long periods possible in seismometers.

It is also desired to provide a force measuring instrument with a very high ratio of damping to mass of the movable element. This is possible in the present device because practically all of the mass in 14 can be made a part of the damper and also because the straight line motion of the mass makes possible small damper clearance without interference. This gives the present invention a considerable advantage over an instrument of the hinged beam type. It thereby eliminates any need for a complicated and expensive concentric ring damper. High damping is advantageous when the device is subjected to large accelerations because the damping restricts the motion of the movable element, thereby limiting errors due to mechanical hysteresis. Also, as previously mentioned, high damping converts an ordinary accelerometer into an integrating accelerometer, which is useful in inertial navigation.

It is further desirable to provide an instrument whose displacement sensitivity and period are not appreciably affected by the position of the movable mass 14 or by tilt of the instrument. To show this, the restoring force of the suspension can be calculated from (5); it is (6) $df_o/dz = 0$ regardless of the position $z$ of the movable mass or of the tilt $\phi$ of the instrument. Therefore the mathematics indicate an infinite sensitivity and period regardless of the position of the movable mass or of the tilt of the instrument.

As has been set forth above, if the device is constructed to satisfy optimum conditions, the mass can translate along a straight line with a slight rotation about the straight line without any change in the length of any of the links. It is noted, however, that there will be stretching or compression of the links when the mass moves if the links are not all the same length. This stretching or compression of the links will contribute to the over-all sensitivity of the suspension. The stretching or compression of one link can be made to approximately balance out the effect of stretching or compression of other links.

With a suspension system as shown in FIG. 1 having eight support links, it is difficult to balance out the effects of stretching or compression of the links over the entire range of motion of the mass. This balancing problem is more difficult with links which are fairly stiff because they exert large forces when they are stretched or compressed. One way of minimizing this sensitivity problem is to reduce the number of links used in the suspension of the mass.

Figure 9:
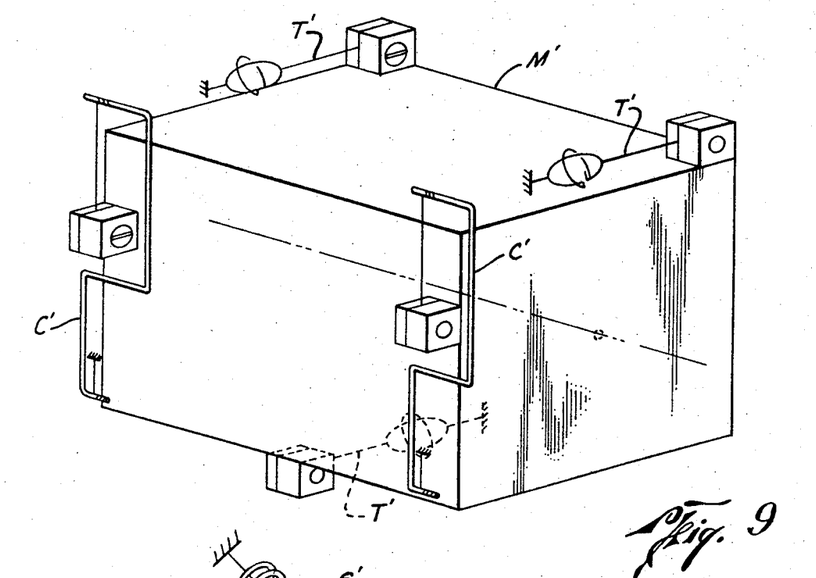
FIG. 9 is a perspective view of another form of force measuring device illustrating support of the mass with only five support elements.
Figure 10:
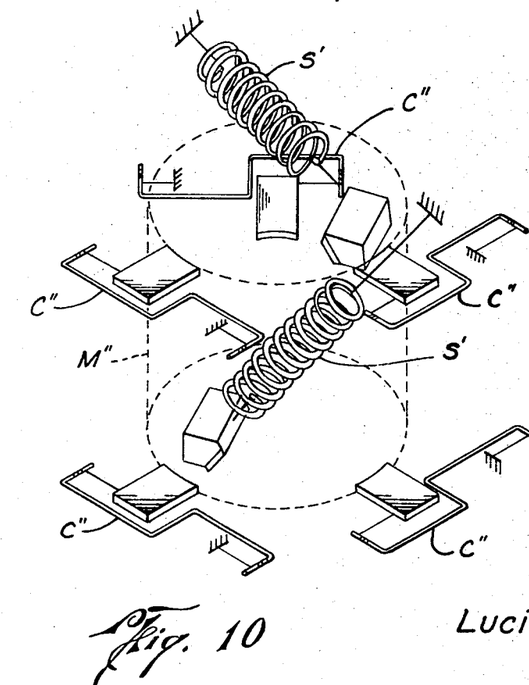
FIG. 10 is a perspective view of another form of device illustrating mounting of a mass with five compression support elements and having zero length springs.

It has been found that to restrict the 6° of freedom of a solid body to 1°, the solid body suspension may have as few as five links. Such suspension system is illustrated in FIGS. 9 and 10. It should be noted, however, that in both forms at least one of such links is a compression link.

In FIG. 9, the mass M' is supported by the two compression links C' and the three tension links T'. The two compression links C' support the mass M' and the three tension links T' are used to counterbalance the torque produced by the compression links C' and the weight of mass M'. All five links should satisfy the optimum design conditions hereinbefore set forth to limit the movement of mass M' to movement along its sensitive axis with a slight rotation thereabout. Deviations from the optimum design conditions will cause the motion of the mass to differ from a straight line motion and will therefore affect the sensitivity of the device. However, such deviations will no longer cause some of the links to be stretched while others are compressed. Adjustment of the links to obtain the desired sensitivity will therefore not be as critical as in the eight link design shown in FIG. 1.

The following considerations show how the sensitivity can be controlled by the adjustment of the lengths of the links. Consider the case in which the three tension links have infinite lengths. Then the mass will not rotate as it translates. With no rotation the compression links will cause the mass to move in a path that is concave upward, which means that the mass is in stable equilibrium, or that its sensitivity is less than it is for equal length links. It therefore appears that the sensitivity of the suspension shown in FIG. 9 can be decreased by making the tension links longer than the compression links and vice-versa.

Another way of adjusting the sensitivity of the device shown in FIG. 9 is to add a small weight at the appropriate place on the mass. For instance consider the case in which a small weight is added to the side of the weight on which the compression links are attached. Then as the mass translates, the added weight will move in a path that is concave upward. This will reduce the sensitivity of the suspension. Adding the weight to the opposite side of the mass will increase its sensitivity.

For gravity meters or vertical accelerometers it is also desirable to use only five links in the suspension. Although there are many ways in which this can be done, the preferred way is shown in FIG. 10. There, all links are compression links C'' and they are kept in compression by the couple exerted by the two zero length springs S'. The links are arranged approximately 120° apart around the axis of rotation of the mass M''. Two links are shown at the top of the mass, two at the bottom, and one at the middle. Such structure has improved sensitivity and may function as a gravity meter or vertical accelerometer.

When the device is used as a tiltmeter, a horizontal seismometer or a horizontal accelerometer, it is operated with its sensitive axis 20 horizontal or nearly horizontal, and consequently there is no appreciable component of gravitational force to be counteracted. Therefore, for such applications the form of the invention without springs 60 and 76 is used. When used to measure level or tilts, the tilt of the base on which the device rests is measured either by deflection of the movable mass or by nulling the mass by tilting the device relative to the base.

When used as a horizontal seismometer, the seismic motion deflects the movable mass. In earthquake seismology it is often desirable that the deflection of the seismometer mass be approximately proportional to the seismic displacement, rather than to the seismic acceleration. This can be accomplished by making the seismometer period appreciably longer than the seismic periods of interest. The device of the present invention is well adapted to do this.

However, if the instrument is to be used to measure seismic or other motions whose periods are both shorter and longer than the period of the instrument, then a problem arises because the response of the instrument to the different periods is considerably different. A good way to overcome this problem is to damp the instrument very highly and to adjust it to have a very long period. This makes it an integrating accelerometer (or velocity meter), as previously mentioned, and permits the attainment of a very linear response to velocity over a very large range of periods. In addition, the high damping permits operation in the presence of large accelerations without causing excessive motion of the movable element. An integrating accelerometer of this type is of particular use in inertial navigation because in that application velocity is of more interest than acceleration.

When the invention is used as a gravity meter, a vertical accelerometer or a vertical seismometer, it is operated with its sensitive axis 20 as nearly vertical as feasible, and consequently there is a substantial gravitational force that must be balanced out. Therefore, for such applications, the form of the device including the springs 60 and 76 is used.

When used as an ordinary gravity meter, the force of gravity is balanced by adjusting the screw 70 which controls the force exerted by the spring 60. The reading on the dial then indicates the value of gravity.

When the invention is to be used as a gravity meter which must operate in the presence of large accelerations or when it is to be used as a vertical accelerometer, it is believed best to damp the movable element very highly and to adjust the displacement sensitivity to a very high value. High damping makes it possible to use very high sensitivity without having to worry about instability problems because the movable mass moves so slowly. The instrument then measures the integral of gravity and vertical acceleration. Such a device is of particular use in measuring gravity at sea and in the air, and in inertial navigation. It should be noted that this may be used to measure any type of force merely by making the mass a force responsive element with respect to the force being measured.

From the foregoing, it can be seen that the force measuring device of the present invention has a movable element whose sensitive axis does not deflect with movement of the element, may have a high ratio of damping to the mass of the movable element and may have a relatively small restoring force on the movable element when displaced. Further, the displacement sensitivity and period of the movable element are not affected by tilting of the device or displacement of its movable element. The improved force measuring device of the present invention may be used to measure tilt, gravity, horizontal acceleration, vertical acceleration, horizontal seismic motions and vertical seismic motions as hereinbefore explained.

The foregoing disclosure and description of the invention are illustrative and explanatory thereof, and various changes in the size, shape and materials, as well as in the details of the illustrated construction, may be made within the scope of the appended claims without departing from the spirit of the invention.

The abstract hereinbefore set forth is neither intended to define the invention of the application which, of course, is measured by the claims, nor is it intended to be limiting as to the scope of the invention in any way.

What is claimed is:

1. A force measuring device, comprising
   a frame,
   a mass, and
   a plurality of substantially equal length links suspending said mass from said frame to permit translation of said mass accompanied by rotation about an axis substantially parallel to said translation and to restrain motion in other directions,
   said links being attached to said mass in spaced relation to each other and at points substantially equidistant from said axis and extending from said mass in other than radial directions and in the same sense around said axis,
   said links being attached to said frame at points substantially equidistant from said axis,
   a plurality of said links being capable of exerting tension but not compression,
   a plurality of said links being capable of exerting compression but not tension.

2. A force measuring device according to claim 1, including
   means for indicating the displacement of said mass relative to said frame.

3. A force measuring device according to claim 2, including
   means for damping the relative movement of said mass relative to said frame.

4. A force measuring device according to claim 1, wherein
   the points of attachment of said links to said frame are substantially the same distance from said axis,
   the points of attachment of said links to said mass are substantially the same distance from said axis.

5. A force measuring device according to claim 4, including
   a zero length spring,
   the point of attachment of said spring to said frame being substantially the same distance from said axis as the points of attachment of said links to said frame,
   the point of attachment of said spring to said mass being substantially the same distance from said axis as the points of attachment of said links to said mass.

6. A force measuring device according to claim 1, wherein
   said tension links each include fine wire elements joined by a spring, and
   said compression links each include fine wire elements joined by a relatively stiff connection member which is longer than the effective length of said compression link whereby the fine wire elements are maintained in tension.

7. A force measuring device according to claim 6, wherein
   each of said connection members is S-shaped whereby it does not interfere with the movement of said mass along said axis.

8. A force measuring device according to claim 1, wherein
   said mass is a regular six-sided structure,
   two of said links are mounted on each of the four sides of said mass other than the two ends through which said axis extends.

9. A force measuring device according to claim 8, wherein
   each of the links on two opposing sides of said mass are tension links, and
   each of the links on the other opposing sides of said mass are compression links.

10. A force measuring device, comprising
    a mass,
    a frame,
    a plurality of substantially equal length links connecting between said frame and said mass to mount said mass to said frame, to restrain movement of said mass in two directions and to allow movement in the other direction which movement is accompanied by a rotation of the mass about an axis extending in the direction of movement of said mass, and spring means of substantially zero unloaded length, the points of attachment of said links to said frame being substantially the same distance from said axis, the points of attachment of said links to said mass being substantially the same distance from said axis, the point of attachment of said spring means to said frame being substantially the same distance from said axis as the points of attachment of said links to said frame, the point of attachment of said spring means to said mass being substantially the same distance from said axis as the points of attachment of said links to said mass, said links extending from said mass in directions at an angle to the radial direction through their respective points of attachment to said mass and said links extending in the same sense around the mass.

11. A force measuring device according to claim 10, including a mass, means for displacing the point of attachment of said spring means to said frame in a direction substantially parallel to said axis to counteract the force on the mass that is to be measured, and means for measuring the displacement of said point of attachment of said spring means to said frame.

12. A force measuring device, comprising a frame, a mass, and a plurality of substantially equal length links suspending said mass from said frame to permit translation of said mass accompanied by rotation about an axis substantially parallel to said translation and to restrain motion in other directions, said links being attached to said mass in spaced relation to each other at points substantially equidistant from said axis, said links extending from said mass in other than radial directions and in the same sense around said axis, said links being attached to said frame at points substantially equidistant from said axis, a plurality of said links being compression links capable of exerting compression but not tension.

13. A force measuring device according to claim 12, wherein each of said compression links includes, a relatively stiff connection member, and fine wire elements joined by said connection member which is longer than the effective length of said compression link whereby the fine wire elements are maintained in tension.

14. A force measuring device according to claim 12, including zero length tension spring means connected between said mass and said frame, said spring means being attached to said mass at substantially the same distance from said axis as the point of attachment of said links to said mass.

15. A force measuring device, comprising a frame, a mass, and at least five substantially equal length links suspending said mass from said frame to permit translation of said mass accompanied by rotation about an axis substantially parallel to said translation and to restrain motion in other directions, said links being attached to said mass in spaced relation to each other and at points substantially equidistant from said axis and extending from said mass in other than radial directions and in the same sense around said axis, at least one of said links being capable of exerting compression but not tension.

* * * * *